G. H. REYNOLDS & W. TEFFT.
Rock-Drill Chucks.

No. 163,257. Patented May 11, 1875.

UNITED STATES PATENT OFFICE.

GEORGE H. REYNOLDS, OF NEW YORK, AND WALTER TEFFT, OF MINEVILLE, N. Y.

IMPROVEMENT IN ROCK-DRILL CHUCKS.

Specification forming part of Letters Patent No. 163,257, dated May 11, 1875; application filed April 3, 1875.

*To all whom it may concern:*

Be it known that we, GEORGE H. REYNOLDS, of New York city, and WALTER TEFFT, of Mineville, Essex county, in the State of New York, have invented certain Improvements relating to Rock-Drill Chucks, of which the following is a specification:

The improved chuck is for use in rock-drilling machines where a piston and rod are reciprocated violently by the action of steam or air. The violent and rapidly-recurring blows of a drill against the rock, operated by modern machinery, induce so rapid deterioration of the cutting-edges that it becomes necessary in many kinds of rock to change the drill as often as every ten minutes.

Our improved chuck connects the piston-rod to the drill with great firmness and with unusual facility for exchange of drills. The drill is liberated by a single blow of the hammer, and, on a fresh one being introduced, the movement of a ring necessary to firmly seize it is induced by the blows of the drill against the rock.

The accompanying drawings form a part of this specification, and represent what I consider the best means of carrying out the invention.

Figure 1:
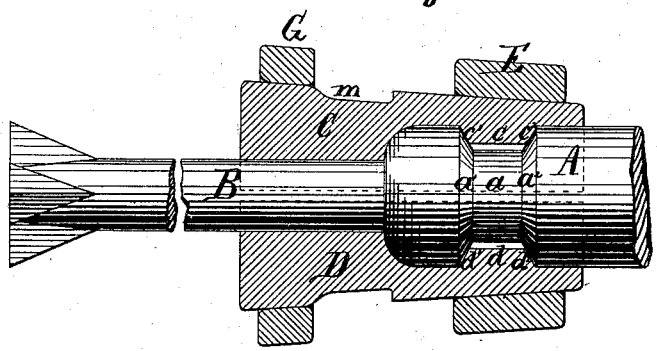
Figure 2:
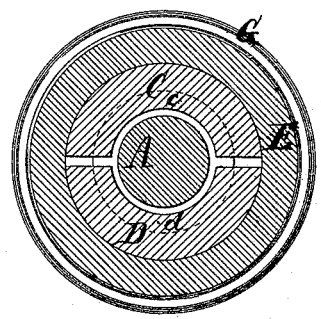

Figure 1 is a longitudinal section, showing the drill in place and firmly confined; and Fig. 2 is a cross-section on the line $x\ x$ in Fig. 1.

Similar letters of reference indicate like parts in both the figures.

The figures represent the novel parts with so much of the piston-rod and drill as is necessary to indicate their relations thereto.

A is the piston-rod, formed with a nicely-rounded end, and with a symmetrical groove having inclined faces $a^1\ a^2$. C D are cheeks, adapted to apply and to fit closely around such piston-rod, and also around the end of the drill B. The exterior surface of the cheeks C D is generally conical, but with an annular recess, $m$, as shown. The interior of the cheeks C D is formed each with an internal collar or continuous projection, $c\ d$, having inclined faces $c^1\ c^2\ d^1\ d^2$. The internal collar formed by this projection is nearly continuous around the piston-rod, and matches into the corresponding annular recess $a$ in the latter, fitting its inclined faces tightly against the corresponding inclines $a^1\ a^2$. The length of the piston-rod beyond this part is carefully proportioned to the depth of the corresponding cavities in the cheeks, so that the cheeks shall bear fairly not only against the inclines $a^1\ a^2$, but also against the rounded end of the piston-rod. The recesses in the cheeks which receive the drill are of less diameter, and are made as perfectly cylindrical as possible, adapted to take firm hold on the cylindrical shank of the drill B. A wide conical hoop, E, is adapted to fit on the tapering exterior of the cheeks C D in the position shown, and thus hold the cheeks firmly around the piston-rod so long as the band E is tightly in position. A narrower tapering hook, G, is adapted to match around the larger portion of the cheeks C D, and confine the cheeks upon the drill B so long as the hoop G is tightly in position.

When it is desired to release the drill, a blow with a hammer against the front side of the hoop G releases its hold. On moving it backward to the recess $m$ it sinks therein, and allows the cheeks C D to relax their hold on the drill. In this condition of the parts, the drill may be readily drawn out by a vigorous pull of the hand, and a fresh one of similar size may be inserted.

To secure the drill it is necessary simply to move the hoop G forward out of the recess $m$, and to cause it to commence to take hold on its tapering seat. Then, steam or air being admitted to the cylinder (not represented) to cause the reciprocations of the piston, the first blow or first few blows of the drill against the rock drives the hoop G forward by its momentum upon the larger portion of the cheeks C D until it can go no farther, and the drill is then tightly held, and is operated like the other. When it is dull the machinery must be again stopped, and the simple manipulation to exchange the drills repeated.

Some of the advantages due to certain features of the invention may be separately enumerated as follows: First, by reason of the groove $a$, receiving the internal projections $c\ d$, we are able to repair or renew the parts with an ordinary lathe, and to re-enforce the piston-rod by allowing the cheeks to extend thereupon and embrace it as far beyond the groove as is necessary to avoid danger of fracture. Second, by reason of the inclined surface $a^1$ acting against the internal projections $c\ d$, and forcing the cheeks C D in one direction, so as to induce a firm pressure of the cheeks against the end of the piston-rod, we hold the parts firmly against rattling. Third, by reason of the band or hoop G fitting on the tapering cheeks C D, where they inclose the drill, we are able to tighten the gripe on the drill by the concussion of the parts on striking the rock, and to liberate the drill by a single blow. Fourth, by reason of the recess $m$, arranged as shown, the cheeks may be allowed to spring apart to any extent desired without necessitating but a small amount of motion of the band G.

We claim as our improvements in rock-drill chucks—

1. The grooved piston-rod A $a$, in combination with correspondingly-formed cheeks C D, and with means for firmly fixing the cheeks upon the rod and engaging in the groove therein, as and for the purposes specified.

2. The inclined surface $a^1$ on one side of the groove $a$ in the piston-rod A, and the corresponding inclined faces $c^1\ d^1$ of the internal projections $c\ d$ on the cheeks C D, combined and arranged to serve as herein specified.

3. In combination with cheeks C D, having a conical exterior surface, and with a hoop, E, for firmly fixing the same to the piston-rod A, the second hoop or band G, adapted to confine and release the drill-bit B, as herein specified.

4. The annular recess $m$ in the cheeks C D, arranged as shown relatively to the second hoop G, in combination with the piston-rod A and drill B, and adapted to serve therewith, as and for the purposes herein specified.

In testimony whereof we have hereunto set our hands this 30th day of March, 1875, in the presence of two subscribing witnesses.

GEO. H. REYNOLDS.
WALTER TEFFT.

Witnesses to the signature of GEO. H. REYNOLDS:
WM. C. DEY,
M. A. VAN NAMEE.

Witnesses to the signature of WALTER TEFFT:
WILLIAM H. CASE,
JOHN T. HICKS.